Feb. 24, 1942.   H. T. KUCERA   2,274,371
TEMPERATURE CONTROL APPARATUS
Filed March 30, 1938   7 Sheets-Sheet 1
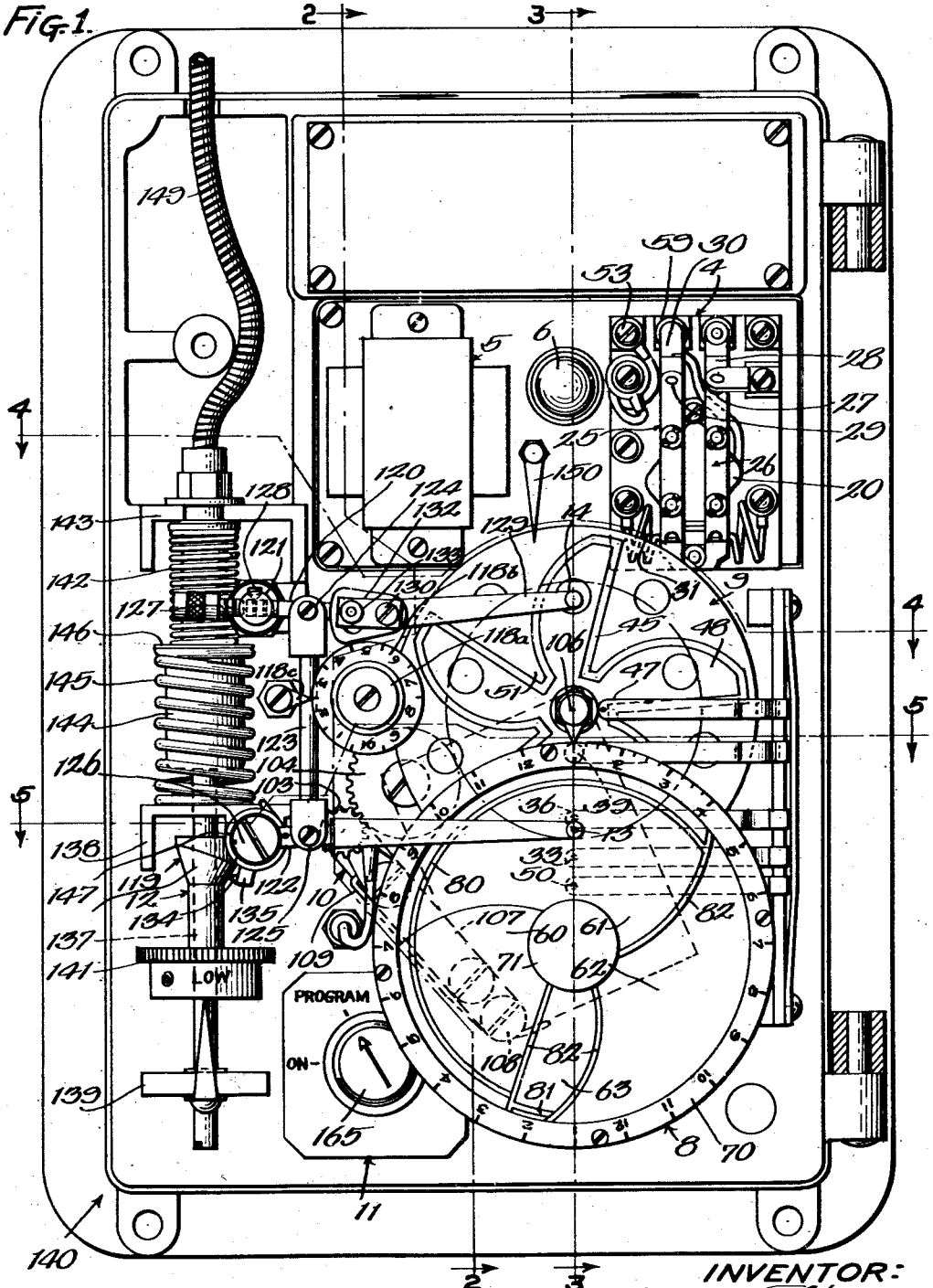
INVENTOR:
Henry T. Kucera
BY
ATTYS.

Feb. 24, 1942. H. T. KUCERA 2,274,371
TEMPERATURE CONTROL APPARATUS
Filed March 30, 1938 7 Sheets-Sheet 2
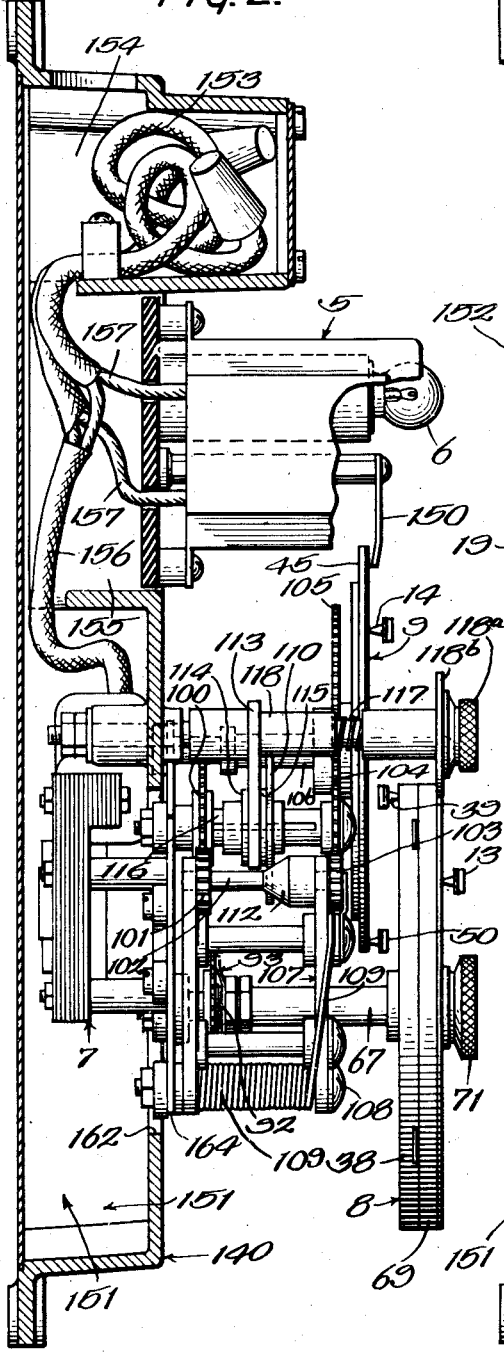
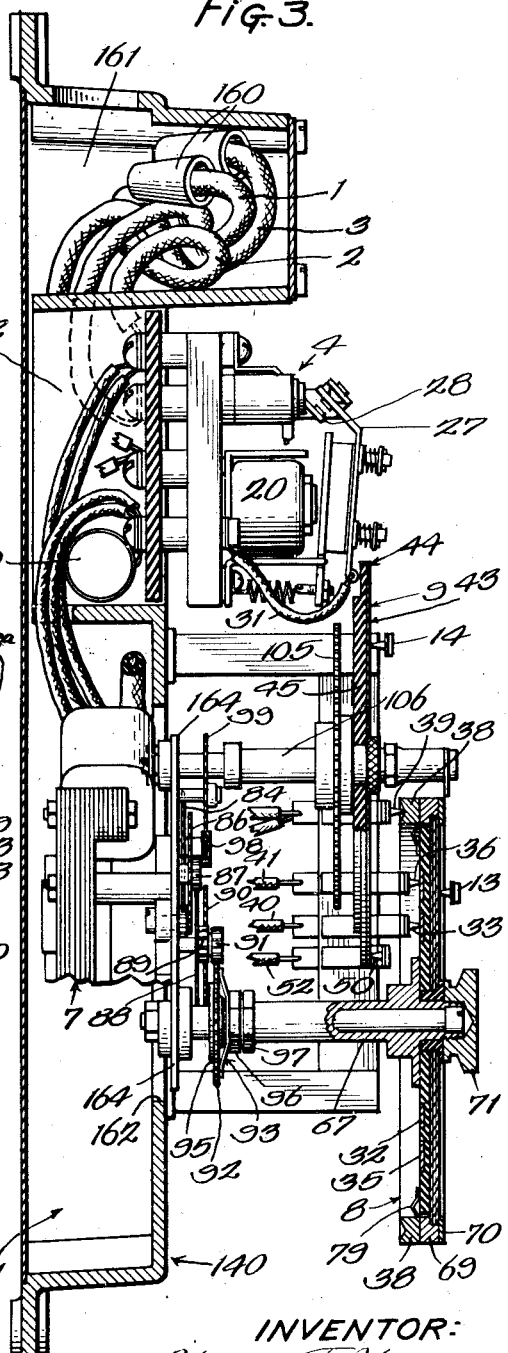
INVENTOR:
Henry T. Kucera
BY Ames, Thiess, Olson & Mecklenburger
ATTYS.

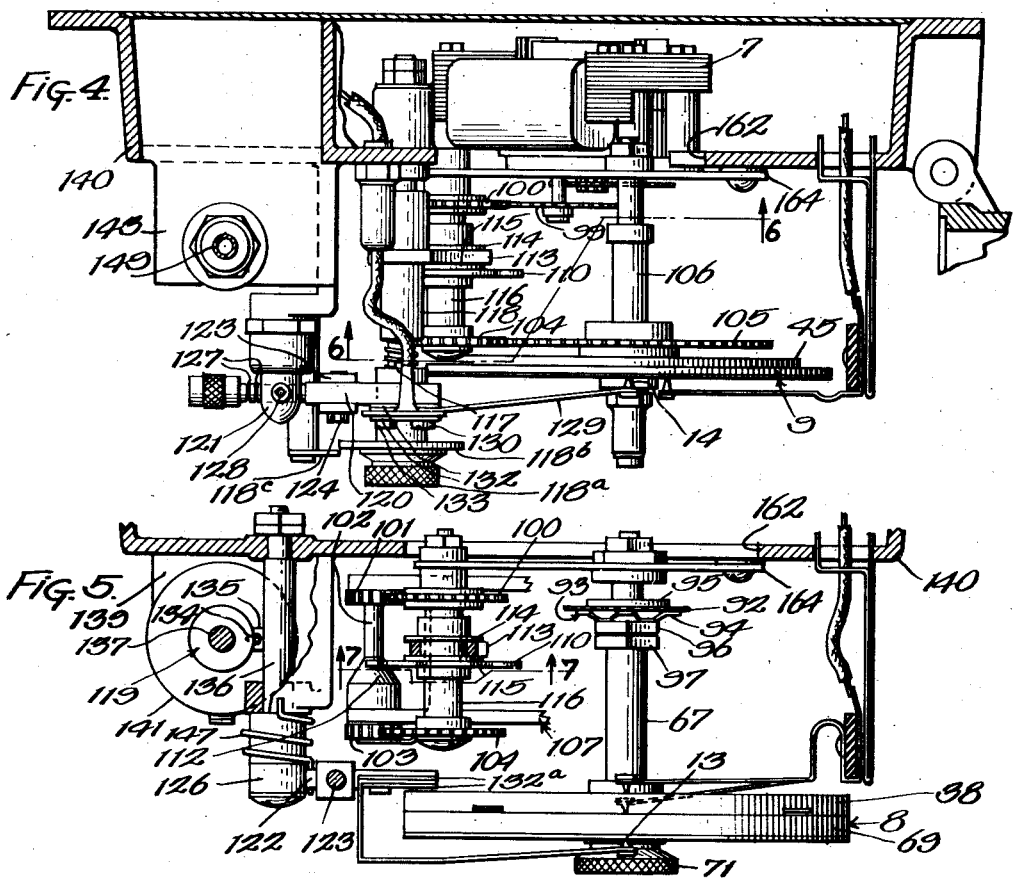

Feb. 24, 1942.    H. T. KUCERA    2,274,371
TEMPERATURE CONTROL APPARATUS
Filed March 30, 1938    7 Sheets-Sheet 4
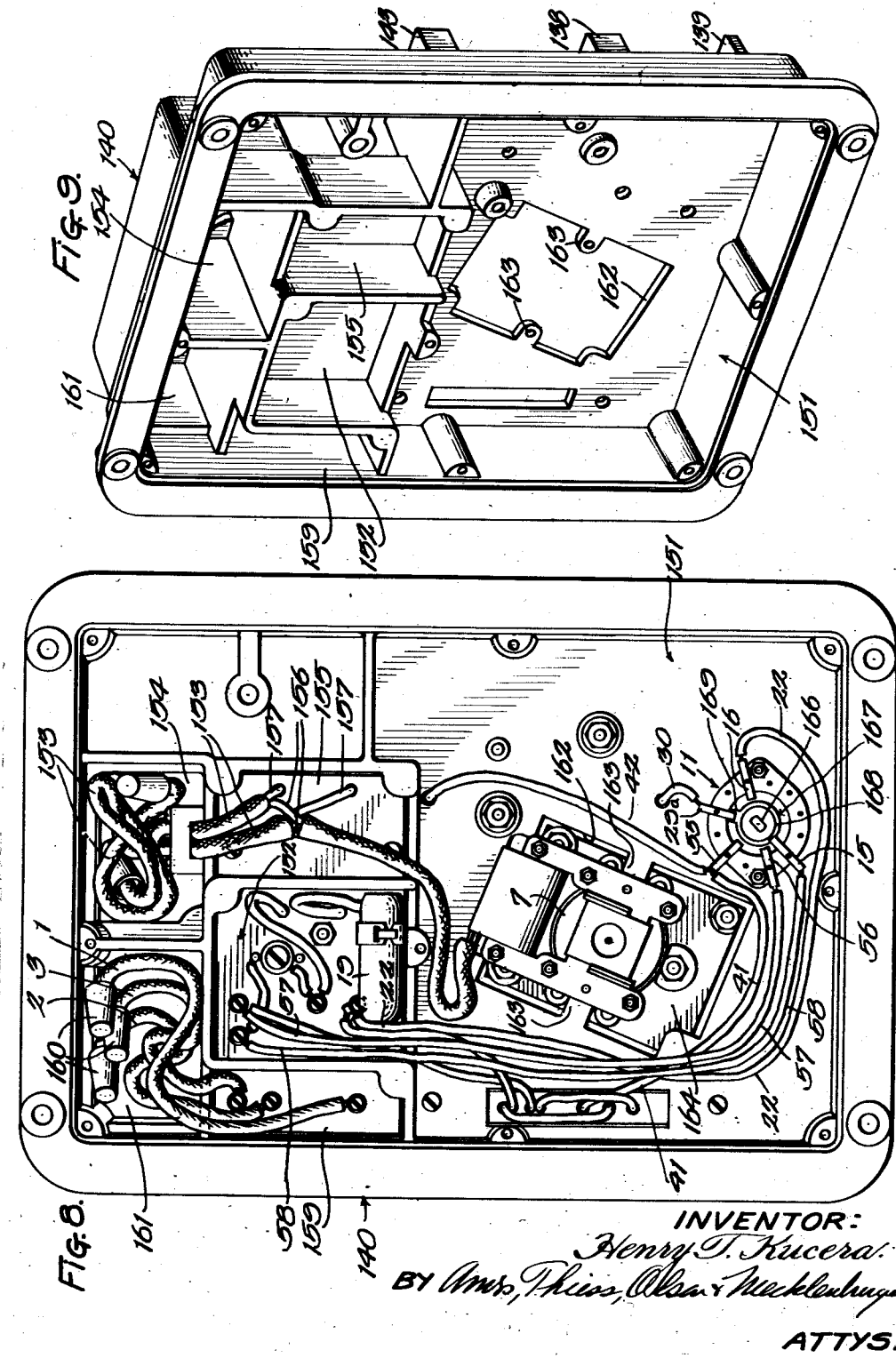
INVENTOR:
Henry T. Kucera.
BY Ames, Phies, Olsen & Mecklenburger
ATTYS.

Feb. 24, 1942. H. T. KUCERA 2,274,371
TEMPERATURE CONTROL APPARATUS
Filed March 30, 1938 7 Sheets-Sheet 5
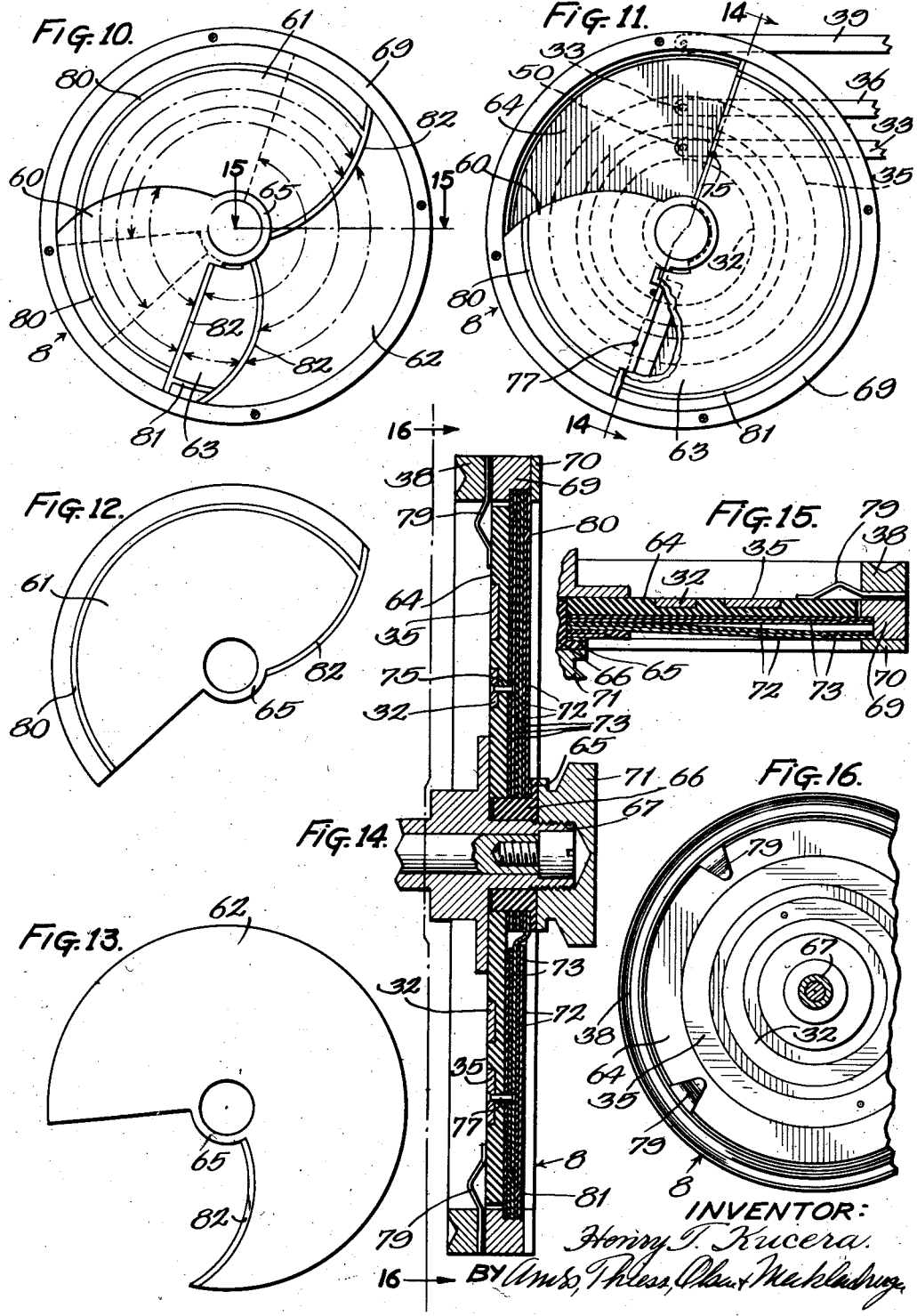
INVENTOR:
Henry T. Kucera.
BY Anus, Thiess, Olson & Mecklenburg
ATTYS.

Feb. 24, 1942. H. T. KUCERA 2,274,371
TEMPERATURE CONTROL APPARATUS
Filed March 30, 1938 7 Sheets-Sheet 6
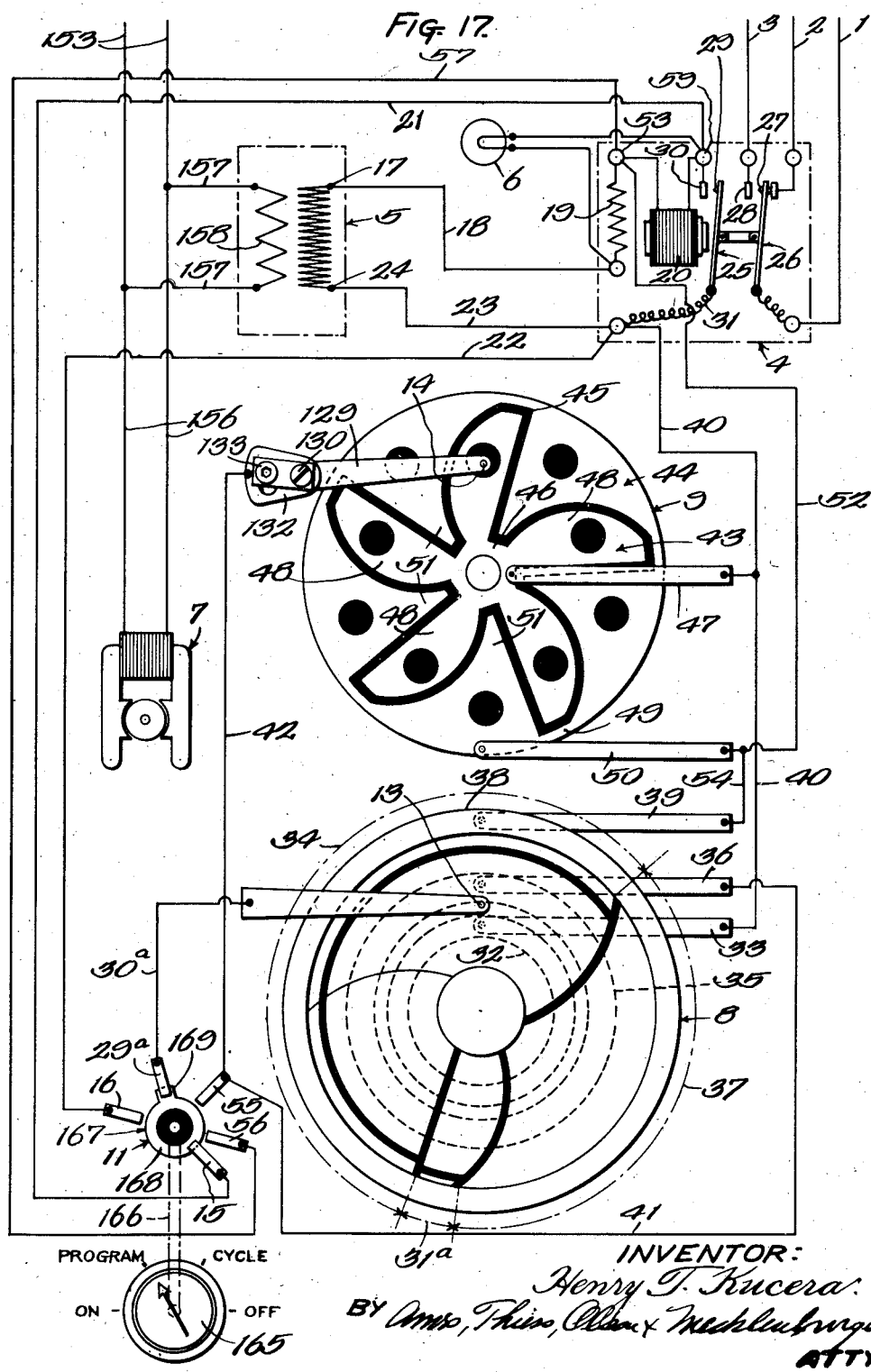
INVENTOR:
Henry T. Kucera
BY Amos, Thiss, Allen & Mechlenburger
ATTYS.

Feb. 24, 1942. H. T. KUCERA 2,274,371
TEMPERATURE CONTROL APPARATUS
Filed March 30, 1938 7 Sheets-Sheet 7

INVENTOR.
Henry T. Kucera
BY Amro, Thiess, Olsen & Mecklenburger
ATTYS.

Patented Feb. 24, 1942

2,274,371

UNITED STATES PATENT OFFICE 2,274,371

TEMPERATURE CONTROL APPARATUS

Henry T. Kucera, Oak Park, Ill.

Application March 30, 1938, Serial No. 198,823

22 Claims. (Cl. 200—37)

My invention relates to temperature control apparatus.

One of the objects of my invention is to produce a temperature control device which will secure periodic functioning of the heating apparatus, the length of the periods being regulated by an element responsive to temperature changes, and to combine with such a control manual adjustment which will adapt the temperature-responsive control to the presence or absence of sun or wind or other general conditions affecting the heat requirements of the premises.

A further object of my invention is to provide improved apparatus for controlling the supply of heat in accordance with the temperature and building occupancy and for varying the schedule of heating according to the temperature.

A further object of my invention is to provide improved apparatus for controlling the supply of heat in which use is made of a plurality of control devices, one of which devices schedules the rate of heating according to the thermal requirements and characteristics, and another of which regulates the rate of heat supply during a portion of the schedule.

A further object of my invention is to provide improved apparatus for controlling the supply of heat in accordance with variations in temperature and the thermal requirements and characteristics of the region to be heated, in which use is made of a plurality of devices, one of which devices will cause comparatively frequent increases and decreases in the heat supply during the period in which it is in control. This frequent increase and decrease in heat supply has a special advantage in connection with steam heating systems, in that it tends to prevent water hammer from occurring in the system; produces a rapid, even steam distribution in the system, and provides a practically continuous modulated transfer of heat from the heat transfer devices to the premises heated.

A further object of my invention is to provide improved apparatus for controlling the supply of heat in accordance with temperature and the thermal requirements and characteristics of the region to be heated, in which use is made of a plurality of control devices for controlling the increase and decrease in heat supply, with means for transferring the control from one device to the other, and of means for varying the action of one device with respect to the other.

A further object of my invention is to provide a method of heat regulation, in which the time of starting of the heating system in the morning is automatically regulated; also the duration of the "heating-up" period, the time of regulated heating for the day-time period, and the time of shutting off the heating system at night in accordance with weather conditions.

A further object of my invention is to provide a method of heat regulation in which the time of starting of the heating system on one morning of the week may be automatically varied from the time of starting on other mornings of the week with the time of starting and the period of extra heating varying with the weather conditions and further varying the time of reducing the rate of heating one day of the week from the time of reducing on other days of the week with the time of reduction varying with the weather conditions.

A further object of my invention is to provide an improved variable speed transmission device for use in connection with the rotatable disc which controls the supply of heat.

A further object of my invention is to provide an improved construction of a rotatable disc for controlling the supply of heat.

Further objects and advantages of the invention will be apparent from the description and claims.

In the drawings, in which an embodiment of my invention is shown:

Figure 1 is a front elevational view of apparatus embodying my invention;

Fig. 2 is a vertical section on the line 2—2 of Fig. 1;

Fig. 3 is a vertical section on the line 3—3 of Fig. 1;

Fig. 4 is a horizontal section on the broken line 4—4 of Fig. 1;

Fig. 5 is a horizontal section on the horizontal line 5—5 of Fig. 1;

Fig. 6 is a sectional view on the line 6—6 of Fig. 4 showing the transmission for the control discs;

Fig. 7 is a fragmentary sectional view on the line 7—7 of Fig. 5 showing part of the variable speed transmission;

Fig. 8 is a rear elevational view of the apparatus;

Fig. 9 is a perspective view of the casing or base;

Fig. 10 is a plan view of the program disc;

Fig. 11 is plan view of the program disc with parts removed;

Fig. 12 is a plan view of the "day-on" contact sector of the program disc;

Fig. 13 is a plan view of the "night-off" contact sector of the program disc;

Fig. 14 is a section substantially on the line 14—14 of Fig. 11;

Fig. 15 is a section substantially on the line 15—15 of Fig. 10;

Fig. 16 is a rear view of the program disc;

Fig. 17 is a wiring diagram for the apparatus;

Fig. 18 is a side elevational view of the control cam;

Fig. 19 is a perspective view of the control cam; and

Figure 20:
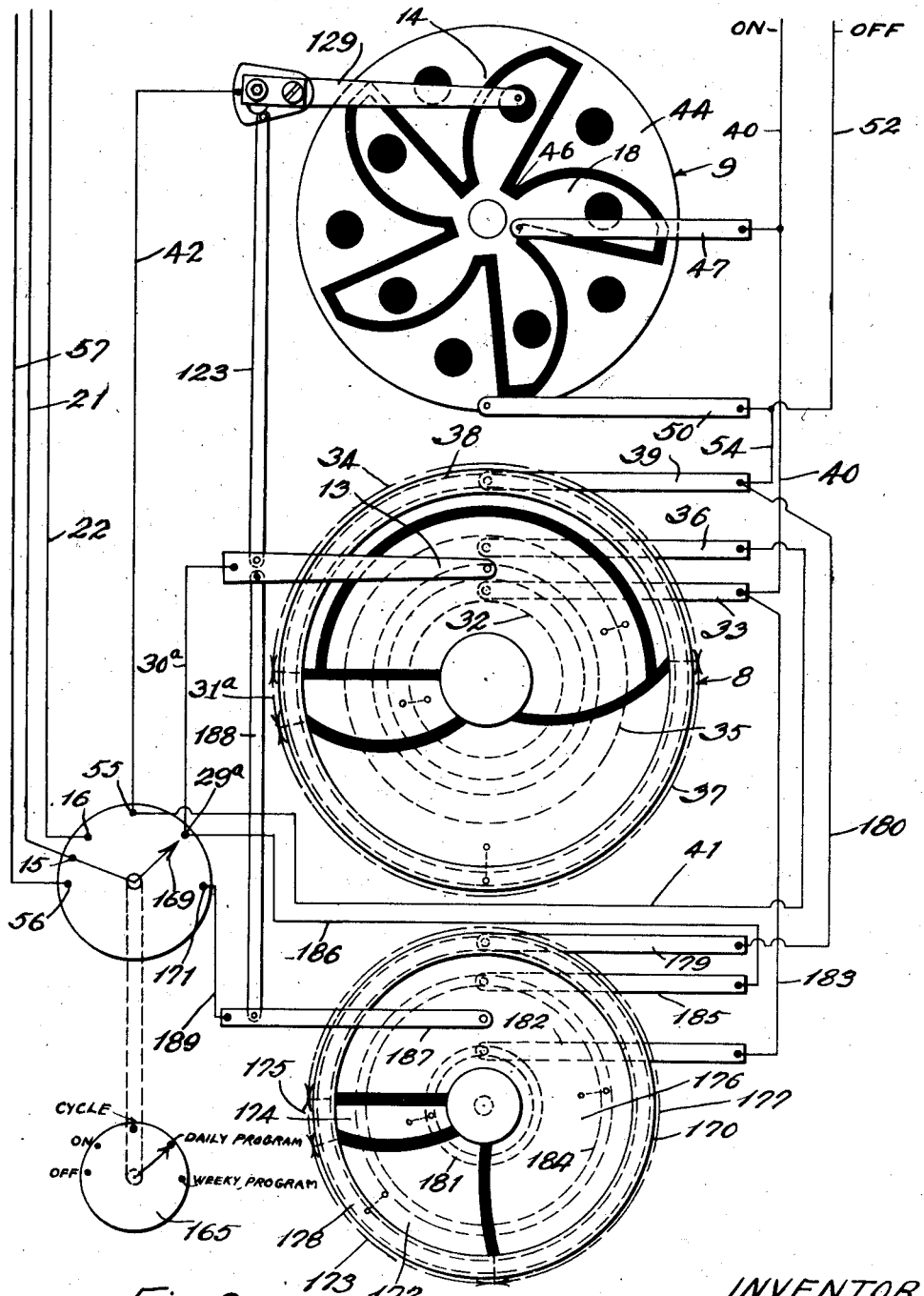
Fig. 20 shows a wiring diagram including a weekly program disc.

Referring to the drawings in detail, the apparatus shown comprises motor circuits 1, 2, and 3 (Fig. 17) for controlling the heat supply to a region to be heated, a relay 4 for controlling said motor circuits, a transformer 5 for reducing the voltage from the line to a voltage suitable for the relay, a pilot light 6 in parallel with the relay circuit, a time-controlled motor 7 which may be a synchronous motor connected with an alternating current line, a program circuit-controlling disc 8 driven from said time-controlled motor for controlling the relay 4 in accordance with the daily demands on the heating system, a cycle circuit-controlling disc 9 also driven from a time-controlled motor for effecting frequent periodic changes in the relay circuit to effect frequent changes in the heat supply, variable speed transmission 10 (Figs. 6 and 7) between the time-controlled motor 7 and the cycle disc 9 for controlling the frequency of the changes in heat supply, a switch 11 for controlling the circuits to the program disc 8 and cycle disc 9, and means 12 controllable by weather conditions and also controllable manually for controlling the position of the contacts 13 and 14 which engage the surfaces of the program disc and cycle disc, respectively.

I will now describe the various circuits made effective as the switch 11 is turned to its different positions ("on," "program," "cycle," and "off") and as the program disc 8 and cycle disc 9 are rotated by the time-controlled motor 7.

*Switch in "on" position*

When the switch is in "on" position, in which the contact 15 is electrically connected with the contact 16 (Fig. 17), the relay 4 will be permanently energized to maintain the heat on constantly, regardless of the action of the program disc 8 and cycle disc 9. With the switch in this position, the circuit is from the transformer secondary terminal 17, through the conductor 18, resistor 19, relay coil 20, conductor 21, switch contacts 15 and 16, and conductors 22 and 23 back to the other transformer terminal 24. With the relay coil thus constantly energized, the relay armature 25 will be attracted and the motor circuit switch 26 will be in "on" position constantly with the contact 27 engaging the contact 28.

A holding circuit is provided for the coil 20 of the relay so that when the relay is energized it establishes a holding circuit which will maintain the relay in "on" position even though the initiating circuit is broken. This holding circuit is established by means of an armature-controlled contact 29 which, when the relay coil is energized, engages a contact 30 to establish a circuit from the conductor 18 through the resistor 19, relay coil 20, contacts 30 and 29, and conductors 25, 31, and 23 to the other terminal 24 of the transformer 5.

*Control by program disc and cycle disc with switch in "program" position*

When the switch is in the "program" position, the switch contact 15 is electrically connected with the switch contact 29a which is electrically connected with the shiftable program disc engaging contact 13 through the conductor 30a. In the program disc, the effective "heating-up" contact surface (indicated by the arc 31a in Fig. 17) is always electrically connected with an annular contact member 32 in engagement with the wiper contact 33. The effective "day-on" contact area (indicated by the arc 34) is always electrically connected with an annular conductor 35 engaged by the contact wiper 36. The effective "night-off" contact area of the program disc (indicated by the arc 37) is always electrically connected with a conductor ring 38 engaged by the contact wiper 39 as the program disc rotates. With this construction, when the wiper contact 13 is in engagement with the "heating-up" contact area 31a, the circuit will be from the "heating-up" contact area 31a to the annular conductor 32, and thence through the wiper contact 33 and conductors 40 and 23 to the transformer terminal 24. Thus, so long as the wiper contact is in engagement with the "heating-up" contact area, the heat will be maintained on and will not be affected by the rotation of the cycle disc 9.

When the program disc has moved to bring the "day-on" contact area 34 into engagement with the wiper contact 13, the circuit from the "day-on" contact area will be from this "day-on" contact area 34 to the annular conductor 35 through the "day-on" wiper contact 36, through the conductors 41 and 42 to the wiper contact 14 for the cycle disc 9. This cycle disc comprises two contact areas 43 and 44 mounted on an insulating disc 45 and spaced from each other to provide insulation therebetween. One of these contact areas 43, which may be termed the inner contact area, comprises a central hub portion 46 engaged by a wiper contact 47 and five arms 48 extending outwardly from the hub portion and electrically connected with the hub portion 46. The other contact surface 44, which may be termed the outer contact surface, may be considered as comprising an outer annular contact surface 49 engaged by a wiper contact 50 and a number of arms 51 extending inwardly from this annular contact surface 49 and lying between the outwardly-extending arms 48 of the inner contact surface. With this construction, when an arm 48 of the inner contact surface engages the contact 14, the circuit from the cycle disc 9 will be from the hub portion 46 of the inner contact surface through the wiper contact 47 and conductors 40 and 23 to the transformer terminal 24. When the cycle disc 9 in its movement brings an inwardly-extending arm 51 of the outer contact area 44 into engagement with the wiper contact 14, the circuit from the cycle disc will be through the wiper contact 50 and conductor 52 to the terminal 53 of the relay 4, thus short-circuiting the coil 20 of the relay and releasing the armature 25 to allow the contact arm 26 to move to "off" position, in which the heat will be turned off. Thus, so long as the program disc 8 maintains the cycle disc 9 in control, the heat will be turned on or off whenever the cycle disc 9 moves to shift the engagement of the wiper contact 14 from the inner to the outer contact surfaces 43 and 44, respectively, and vice versa. Thus, during the "day-on" period of the program disc, the cycle disc is in control and the heat is turned on and off periodically by successive engagement of the wiper contact 14 with the arms of the inner and outer contact surfaces 43 and 44, respectively, of the cycle disc.

When the program disc in its movement brings the "night-off" contact sector 37 into engagement with the wiper contact 13, the circuit from the "night-off" contact area 37 is through the wiper contact 39 and conductors 54 and 52 to the wiring terminal 53 of the relay. This short-circuits the coil 20 of the relay and allows the relay contact 26 to move to "off" position, in which position it remains until the "heating-up" contact sector 31a is brought into engagement with the wiper contact 13.

*Switch in "cycle" position*

When the switch is turned to the "cycle" position, the contact 15 is eletrically connected with the contact 55 and the circuit for the relay 4 is from the transformer terminal 17 through the conductor 18, resistor 19, relay coil 20, conductor 21, switch 11, and conductor 42 to the wiper 14 for the cycle disc. If the wiper 14 for the cycle disc is in engagement with the inner contact surface 43, the circuit from there on is through the inner cycle contact 43 through the wiper contact 47 and conductors 40 and 23 to the other terminal 24 of the transformer. This will establish the above-described holding circuit for the relay 4 so that it will be maintained on until a change in circuit is effected. This change in circuit is effected by the rotation of the cycle disc 9 which will move to bring the outer contact area 44 into engagement with the wiper contact 14. Under this condition, the circuit from the outer contact area 44 of the cycle disc will be through the wiper contact 50 and conductor 52 to the terminal 53 of the relay. This will short-circuit the relay coil 20 and the holding circuit therefor, allowing the relay contact 26 to move to "off" position in which the heat will be turned off.

*Switch in "off" position*

When the switch 11 is turned to "off" position, the contact 15 is electrically connected with the contact 56, and the relay coil 20 and its holding circuit area short-circuited by the circuit leading from the transformer terminal 17 through conductor 18 and resistor 19 to the relay terminal 53, through the conductor 57, switch contacts 56 and 15, and conductor 21 to the relay terminal 59, through contact 30, armature 25 and conductors 31 and 23 to terminal 24 of the transformer. This shorting out of holding coil 20 causes relay armature 25 to disengage from contact 30, breaking the circuit. The relay contact 26 thus remains in "off" position.

*Program disc construction*

The program disc comprises a plurality of sector-like members, some of which are angularly adjustable about the axis of the disc to change the length of the period of control exerted by one or more of the sector-like members. This program disc is shown in detail in Figs. 10 to 16, inclusive. As shown, the disc 8 comprises four of these sectors 60, 61, 62, and 63, each having a conducting surface engageable with the wiper contact 13. The "day-on" contact area comprises two of these sectors 60 and 61, electrically connected with each other, one of them (60) being secured to the insulating disc-like base 64 and the other (61) being angularly adjustable about the axis of the disc to vary the "day-on" period. These sectors are so mounted and arranged that the rear edge of one overlaps the front edge of the succeeding sector so that as the disc 8 rotates the wiper contact 13 will ride easily off from one sector into the succeeding sector. This overlapping engagement of the sectors also permits the angular adjustment of some of the sectors with respect to the others. Both of the "day-on" sectors 60 and 61 and also the "night-off" sector 62 are provided with an annular portion 65 embracing an insulating positioning and centering bushing 66, which fits over the end of the tubular shaft 67 on which the program disc is mounted. The sectors 60 and 63 are permanently secured to the insulating disc 64 which is mounted for rotative adjustment in a mounting ring 69. The assembly, including the disc 64 and the sectors 60, 61, 62, and 63, are held in place by means of a retaining ring 70, secured to the mounting ring 69, and a thumb nut 71 threaded on the end of the shaft 67 and bearing on the bushing 66. The "heating-up" sector 63 is thus permanently secured to the circular insulating base 64, as is also the front sector 60 of the "day-on" contact surface. The other two sectors—that is to say, the rear sector 61 of the "day-on" contact area and the "night-off" contact sector 62—are both angularly adjustable to an extent limited by the overlapping engagement of the sectors, to change the positions of the insulating rear edges of these sectors 61 and 62, thus enabling a change to be effected both in the time of beginning the "night-off" period and in the time of the ending of the "night-off" period. Conversely, this changing of the beginning and ending of the "night-off" period effects a change in the ending of the "day-on" period and in the beginning of the "heating-up" period. The conducting surfaces of these sectors may be thin sheets of metal 72 (Fig. 14) backed up by thin sheets of insulation 73 to keep the sectors out of electrical engagement with each other. The electrical connection between the two sectors of the "day-on" contact surface is effected by the engagement of the annular portions 65 of one sector with another, no insulation being provided between these annular portions.

The "heating-up" contact area of the sector 63 is electrically connected with the inner conducting ring 32 by means of a rivet 75 extending through the sector 63, insulating base 64, and annular conductor 32. The front sector 60 of the "day-on" contact surface is electrically connected with the intermediate conductor ring 35 by means of a rivet 77 extending through the "day-on" sector 60, insulating base 64, and conductor ring 35 (Figs. 11 and 14). The "night-off" sector 62 is electrically connected with the outer contact ring 38 by the engagement of the outer edge of the "night-off" contact sector 62 with the metal mounting ring 69 and retaining ring 70, which are electrically connected with the contact ring 38.

The insulating base and contact sectors are mounted for rotative adjustment in the mounting ring 69 having an annular recess for receiving the edges of the sectors, the retaining ring 70 having an inwardly-extending portion overlying the outer edges of the sectors for holding them in the annular recess. In order to provide a yielding support for the insulating disc 64 and the sectors carried thereby, a plurality of leaf springs 79 are provided, secured to the contact ring 38 and having their ends bearing on the inner surface of the insulating disc 64. These springs tend to hold the insulating disc 64 and the contact sectors carried thereby over against the retaining ring 70 and to provide a yielding spring pressure of the edges of the contact sectors against the retaining ring 70.

In order to prevent electrical connection between the "day-on" contact sector and the annular supporting rings, both of the "day-on" contact sectors 60 and 61 are provided with arcuate insulating strips 80. The "heating-up" contact sector also is provided with an arcuate insulating strip 81 to prevent electrical connection between the effective contact area and the supporting rings 69 and 70. The rear edges of the "day-on" contact sector 61, the "night-off" contact sector 62, and the "heating-up" contact sector 63 are provided with insulating strips 82, respectively, to prevent the wiper contact 13 from simultaneous engagement with the conducting surface of one sector and the conducting surface of a succeeding sector.

Transmission to circuit-controlling discs

The transmission from the drive pinion 83 (Fig. 6) of the synchronous motor to the program disc 8 comprises a spur gear 84 meshing with the motor pinion 83, a pinion 85 rotatable with this gear 84, a gear 86 meshing with this pinion 85, a pinion 87 rotatable with this gear 86, a gear 88 meshing with this pinion 87, a pinion 89 rotatable with this gear 88, a gear 90 meshing with this pinion 89, a pinion 91 rotatable with this gear 90, and a gear 92 meshing with this pinion and having a slip friction drive connection 93 with the tubular shaft 67 (shown in Fig. 5) on which the program disc 8 is mounted. This slip friction drive comprises a leaf spring washer member 94 having three spring fingers yieldingly holding the gear 92 against a collar 95 on the tubular shaft 67 and an adjusting nut 96 (Fig. 5) and lock nut 97 for holding the leaf spring washer in proper engagement with the gear.

The transmission from the synchronous motor to the cycle disc comprises a variable speed construction, as will be pointed out in detail. This transmission includes the gear 84 driven by the motor pinion 83, the pinion 98 rotatable with this gear 84, a gear 99 meshing with this pinion, a gear 100 meshing with the gear 99, a pinion 101 (Figs. 5, 6, and 7) meshing with this gear 100, a shaft 102 on which this pinion is mounted, another pinion 103 mounted on this shaft, a gear 104 meshing with this pinion, and a gear 105 meshing with this gear and mounted on the tubular shaft 106 on which the cycle disc 9 is mounted.

In order to provide for the variable speed previously mentioned, the shaft 102, on which the two pinions 101 and 103 are mounted, is mounted on a swinging bracket 107 (Figs. 1, 2, 5, 6, and 7), which bracket may be periodically swung automatically to cause the two pinions 101 and 103 to disengage temporarily with respect to the two gears 100 and 104. This bracket 107 is mounted for pivotal movement about a pivot post 108 and is urged in a direction to effect meshing of the pinions with the gears by means of a coil torsion spring 109. The periodic engagement and disengagement of the pinions with respect to the gears is effected by means of a cam wheel 110 mounted to rotate with the gear 100 and having a plurality of cam portions 111 engageable with a conical follower 112 on the shaft on which the pinions 101 and 103 are mounted.

In order to change the extent of meshing travel of the driving gear with respect to the driven gear, the cam wheel 110 is made adjustable up and down to bring its cam-like edge into engagement with varying peripheries of the conical follower 112. The larger the diameter of the periphery of the conical follower which is engaged by the cam edge, the greater will be the throw of the cam and hence the longer the period of unmeshed travel of the driving gear with respect to the period of meshed travel. This axial shifting of the edge cam member is effected by means of a shifting yoke 113 engageable between annular shoulders 114 and 115 rotatable with the cam wheel 110. The hub portion of the cam wheel 110 is splined on the tubular shaft 116 which rotates with the driving gear. The movement of the shifting yoke is effected by means of a rotatable externally screw-threaded shaft 117 held against axial movement and having a threaded engagement with a sleeve 118 on which the shifting yoke 113 is mounted. With this construction, it will be seen that the period of meshing travel of the driving gear 100 with respect to its period of unmeshed travel may be varied as desired and that the driven gear 104 and the cycle disc 9 rotated therewith may be intermittently driven, the driven periods being varied as desired with respect to the nondriven periods. The cam and gear reduction is so designed that the frequency of oscillation of the yoke 107 carrying the disengageable idler pinions 101 and 103 will be great enough to result in a relatively small motion of the cycle disc for each oscillation of the pinion-carrying frame. It has been found in practice that the intermittent motions of the cycle disc are so small that the effect on the circuit-controlling contacts is not materially different from the effect that would be obtained by an infinitesimally variable speed transmission. The effect of continuous rotation may be approached by increasing the speed of rotation of cam wheel 110 and increasing the size of gears 100 and 104. A thumb wheel 118a is secured to the shaft 117 for operating it manually. This thumb wheel carries a dial 118b cooperating with a pointer 118c for indicating the adjustment of the cam wheel 110.

Cycle disc

Due to the counter-radial arrangement of the edges of the conductor sectors of the control discs, a change in the radial position of the sector-engaging contacts 13 and 14 will change the length of time during which a contact will remain in engagement with a given sector as the sector moves underneath the wiper contact. The greater the demand for heat, as determined by the manually and conditionally controlled cam 119, the closer will the wiper contacts 13 and 14 approach the axes of the control discs 8 and 9, resulting in a longer period of "heat-on" with respect to the period of "heat-off." The arm 120 carrying the wiper contact 14 for the cycle disc 9 is mounted on a rock shaft 121 and is connected with the pivoted arm 122 of the wiper 13 for the program disc by means of a link 123 pivotally secured to the contact arm 120 at 124 and pivotally secured to the contact arm 122 at 125. The contact arm 122 is pivotally mounted at 126.

In order to change the extent of movement of the cycle contact wiper 14 with respect to the extent of movement of the program contact wiper 13, I provide means for varying the distance between the axis of the rock pin 121 and the pivotal connection of the link 123 with the contact arm 120. This adjustment is effected by providing a cylindrical portion of the contact arm slidable in an opening in the rock shaft and providing this cylindrical portion with a plurality of annular grooves 127 in any one of which a set screw 128 threaded into the rock shaft may be engaged. With this construction, the greater the distance between the axis of the rock shaft 121 and the point of pivotal connection 124 between the link 123 and contact arm 120, the less will be the movement of the contact wiper 14 with respect to a given movement of the contact wiper 13.

For varying the field of travel of the cycle disc wiper 14, the leaf spring member 129 on which this wiper is mounted may be pivotally adjustable on the wiper carrying arm 120. This pivotal adjustment may be effected by means of a pivot screw 130 (Figs. 1 and 4) extending through a hole in the leaf spring 129 and threaded into the contact-carrying arm 120. This leaf spring member may be frictionally held in adjusted position by means of a headed screw 133 extending through a slot in the leaf spring member 129 and threaded into contact arm 120. The spacer washers 132 serve to electrically isolate the leaf spring member 129 from the contact-carrying arm 120 and spacer washers 132a serve to electrically isolate the contact wiper 13 from the contact arm 122.

Disc contact control

The apparatus, controlled by conditions and manually for controlling the disc contacts 13 and 14, may be similar to that described in my co-pending application Serial No. 57,449, filed December 28, 1935. It comprises a double-acting cam member 119 mounted for manual rotation and condition-controlled axial adjustment having an irregular conical surface engageable with a follower pin 134 mounted on a rock arm 135 (Figs. 1 and 5) secured to the rock shaft 136 on which the arm 122 for the program wiper contact is mounted.

This double-acting cam 119 is mounted on a shaft 137 which is rotatably and slidably mounted in brackets 138 and 139 on the base 140. The rotative adjustment of this cam 119 is effected by means of a knurled hand wheel 141 mounted on the cam shaft 137. The axial adjustment is effected by means of a hollow expansible diaphragm member 142, the upper end of which is secured to a bracket 143 on a base 140 and the lower end of which seats in a cup-like member 144 with which the upper end of the cam shaft 137 has a swivel connection. This expansible diaphragm member acts against the pressure of a coil compression spring 145, the upper end of which engages a flange 146 on the cup member 144 and the lower end of which is supported by the bracket 138 on the base.

The design of the apparatus is such that as shown in Fig. 1, a low temperature will cause a contraction of the expansible chamber 142, causing a rise in the conoidal cam member 119 to allow the follower member 134 to shift to the left under the action of the torsion spring 147 and to cause the contact member 14 to drop to increase the length of the "on" periods and decrease the length of the "off" periods, thus increasing the heat supply to take care of the low temperature. Conversely, a high temperature will expand the chamber 142, pushing the cam member down and causing the follower 134 to push the contact member 14 upwardly to shorten the length of the "on" periods and increase the length of the "off" periods to take care of the higher outside temperature. However, as previously pointed out, the control by outside temperature is not sufficient to take care of other variations and conditions such as cloudiness, high wind, humidity, variation in building occupancy, etc., and a further manual control may be exercised by means of the adjustable hand wheel 141 which can be operated to swivel the plunger rod 137 and bring a different element of the conoidal surface into cooperative relation with respect to the follower. Various designs for the surface of this cam 119 may be employed. That shown in Figs. 18 and 19 comprises a generally conoidal surface 148, the intersections of which with different planes through the axis of the cam have different degrees of angularity with respect to the axis of the cam. Thus, in Fig. 18, the left-hand side of the conoidal surface shown has an angle of approximately 45 degrees with respect to the axis of the cam, whereas the right-hand side of the conoidal surface has an angle with respect to the axis of the cam of approximately 20 degrees. The angularity of the intersection of the axial planes may be made to vary gradually from the greater to the lesser angle. Because of this construction, the radial distance of the follower 134 from the axis of the cam will be changed as the plunger rod 137 is turned by means of the hand wheel 141, thus changing the position of the contact with respect to the drum. It will be seen that a change of radial distance will take place regardless of the vertical position of the cam determined by the thermostatic control but that the amount of change of said radial displacement for a given turning movement of the cam will increase as the outside temperature decreases. It may also be seen that the rate of change of the radial distance for a given vertical movement will vary with the angular position of the cam.

By means of this manual control of the cam, an attendant can superimpose a manual control on the thermostatic control to take care of unusual conditions, such as high winds, cloudiness, excessive humidity, increase in heating load, etc., which would cause a requirement for more heat than would be furnished under the normal operation of the thermostatic control. If a condition exists calling for such additional heat supply, the attendant, by means of the hand wheel 141, will rotate the plunger 137 and the cam 119 carried thereby to shift the cam to a position in which the radial distance of the follower 134 from the axis of the cam will be increased, thus shifting the contacts 13 upwardly, as viewed in Fig. 1, to decrease the length of the "heat-on" periods and increase the length of the "heat-off" periods. On the other hand, if conditions are such that less than the normal supply of heat is necessary—such as might be occasioned by a very sunshiny quiet day, or over a week end when a lower maintained temperature is desired—the attendant, by means of the hand wheel 141, may rotate the cam 119 to a position which will decrease the radial distance of the follower 134 from the axis of the cam, resulting in a shift of the contact 13 downwardly, as viewed in Fig. 1, with a consequent increase in the heat supply. At the new angular positions of the cam, should there be a variation of temperature outdoors, the radial distance will be varied accordingly, with the rate of variance greater than normal in the first case and less than normal in the second case.

The expansion and contraction of the expansible diaphragm 142 is controlled by a bulb connected with the expansible diaphragm by means of flexible tubing 149. This bulb may be placed in any desired location, generally where it will be exposed to outside temperature so that an increase in the temperature of the bulb will cause an expansion of the gas in the bulb and a consequent expansion of the expansible bellows 142, and vice versa.

In its extreme upward movement, the leaf spring 129 may carry the contact wiper 14 beyond the peripheral edge of the cycle disc. In order to steer the contact wiper 14 back into the cycle disc, a supporting finger 150 (Figs. 1 and 2) is provided which is engaged by the leaf spring 129 in its extreme upper movement so that when the leaf spring in its controlled movement moves back toward the cycle disc, this guide finger will steer the leaf spring so as to direct the wiper contact 14 against the front face of the cycle disc 9.

*Base and wiring*

The different parts of the apparatus are mounted on the cast metal base 140, the rear portion of which forms a housing divided into a number of compartments in which various parts of the apparatus and wiring are located.

The program disc 8, cycle disc 9, associated contacts, control mechanism therefor, transformer 5, pilot light 6, and relay switch 4 are mounted on the front of this base. A suitable hinged cast metal cover (not shown) is provided for covering and enclosing the parts of the apparatus mounted on the front of the base. The synchronous motor 7, the manually operated switch 11 (Figs. 1 and 8), and part of the wiring therefor are mounted in a large lower compartment 151 (Figs. 8 and 9) in the rear of the base plate. The resistor 19 and the wiring terminals for the relay 4 are mounted in a compartment 152 above the large lower compartment. The line wires 153 lead into the small upper compartment 154 in the rear of the base and thence into a compartment 155 directly underneath this upper compartment 154. The wires 156 for the synchronous motor branch off from the line wires in this compartment 155.

The wires 157 for the transformer branch off in this compartment 155 and lead to the terminals of the primary 158 of the transformer 5. The conductors 1, 2, and 3 controlled by the relay 4 lead into a small compartment 159 at the side of the base.

In preparing the apparatus for shipment, the protective insulating connectors 160 for the ends of the wires 1, 2, and 3 may be pushed into the compartment 161 at the upper end of the insulating base, which compartment 161 acts as an outlet box. The compartments are separated from each other by means of suitable walls or webs formed integrally with the base casting. The lower large compartment 151 is provided with a large opening 162 into which extends a pair of lugs 163 on which the base 164 carrying the synchronous motor 7 and the transmission from the motor 7 to the cycle disc and program disc are mounted.

The switch 11 (Figs. 1, 8, and 17) is provided with a thumb wheel 165 mounted on the shaft 166 on which the movable switch contact 167 is mounted. This movable contact comprises an annular conductor portion 168 always in wiping engagement with the contact 15 and a projecting finger portion 169 selectively engageable with any one of the switch contacts 16, 29, 55, and 56.

In Fig. 20 I have shown apparatus designed to provide an additional control for the heat supply, including a weekly program disc 170. With this apparatus, in addition to the control exercised by the cycle disc 9 and daily program disc 8, I have provided a weekly program disc 170 whereby heat may be turned off during a substantial period at the end of the week—for instance, from Saturday noon until early Monday morning—and whereby a "Monday morning heating-up" period is provided whereby heat may be turned on for a substantial period at the beginning of the week in order to bring up the temperature of the heated spaces to the desired level following the "week-end heat-off" period. During the greater part of the week—that is, from the end of the "Monday morning heating-up" period until the beginning of the "week-end heat off" period—the weekly program disc places the control of the heat supply under the daily program disc 8 and the cycle disc 9.

In this construction and diagram, the parts or elements 8, 9, 13, 14, 15, 16, 21, 22, 29a, 30a, 31a, 32–42, incl., 46, 47, 48, 50, 52, 54, 55, 56, 57, 129, 165, and 169 may be the same as shown in Fig. 17. In this connection it is to be noted that when the conductor 40 is connected with the switch contact 169, the heat supply will be "on" and that when the conductor 52 is electrically connected with the switch contact 169, the heat supply will be "off" just as in the construction and circuit shown in Fig. 17. With this understanding, it will be seen that when the switch contact 169 is set to engage the respective contacts 16, 29a, 55, and 56, respectively, the circuits and controls will be the same as when the corresponding connections are made in Fig. 17. In Fig. 20, however, an additional switch contact 171 is provided which places the weekly program disc 170 in control. This weekly program disc may, in its general structure, be similar to the daily program disc 8. It comprises three sector-shaped contact faces electrically insulated from each other, including a "week-end off" sector 172, the extent of which is defined by the arc 173, a "Monday morning heating-up" sector 174, the length of which is defined by the arc 175, and a "daily program operation" sector 176, the length of which is defined by the arc 177. The sector 172 is electrically connected with a contact ring 178 which is engaged by a wiper contact 179 electrically connected through the conductor 180 with the conductors 54 and 52. The contact sector 174 is electrically connected with a contact ring 181 engaged by wiper contact 182 which is electrically connected through the conductor 183 with the conductor 40. The contact sector 176 is electrically connected with a contact ring 184 which is engaged by wiper contact 185 electrically connected by a conductor 186 with the conductor 30a. Both in Figs. 17 and 20, the shiftable contact arms 13 and 14 are mechanically connected together by means of the link 123 so that movement of the contact arm 13 will also cause movement of the contact arm 14, thus bringing both contact arms under the control of the control cam 12. In Fig. 20, the shiftable contact arm 187 also is connected with the contact arm 13 by means of a link 188 so that movement of the contact arm 13 will cause a corresponding movement of the contact arm 187 which engages the contact surfaces 172, 174, and 176 of the weekly program disc 170. This will enable the outside temperature control means 12 to exert an influence on the time element in the weekly program disc 170, since the sectors 172, 174, and 176 are so shaped and designed that the angular extent of the sectors varies with the distance from the axis of the disc 170.

With this construction, it will be seen that when the contact arm 169 is in engagement with the contact 171, so long as the shiftable contact 187 is in engagement with the "daily program operation" sector 176, the contact arm 169 will be electrically connected with the switch contact 29a through the conductor 189, contact arm 187, contact sector 176, contact ring 184, wiper contact 185, and conductor 186 and that therefore during this period the daily program disc and the cycle disc will exercise control just as in the circuit shown in Fig. 17. However, when the weekly program disc moves counterclockwise to bring the "week-end off" sector 172 into engagement with the shiftable contact 187, the heat will be turned off, since the conductor 52 will be electrically connected with the contact 169 through the conductor 189, shiftable contact arm 187, sector contact 172, conductor ring 178, wiper contact 179, conductor 180, and conductor 54. When the weekly program disc 170 moves still further counterclockwise to bring the "Monday morning heating-up" contact sector 174 into engagement with the shiftable contact 187, the heat will be turned on regardless of the positions of the daily program disc 8 and the cycle disc 9, since the conductor 40 is then electrically connected with the switch contact 169 through the conductor 189, shiftable contact 187, "Monday morning heating-up" sector 174, contact ring 181, wiper contact 182, and conductor 183. In the weekly program disc 170, the extent of the sector 176 may, if desired, be made adjustable or variable just as the "day-on" sector of the daily program disc 8 is made adjustable. By means of this adjustment, the heat may be cut off at any time desired toward the end of the week; that is to say, it may, for example, be cut off at noon Saturday, or later. The "Monday morning heating-up sector may be designed so as to give any desired length of time for the "Monday morning heating-up" period, the length of this "heating-up" period of course being varied by the control exercised by outside temperature on the shiftable contact.

It is obvious that a control disc might be designed which would not have contact surfaces but in place thereof could have embossed surfaces engageable by a pivoted rider which would control the making of a contact.

Referring to the cycle disc, the daily program disc, and the weekly program disc, it is obvious that any one of these three discs could be used without either of the others. For example, the cycle disc could be used without either of the program discs to provide intermittent shots of heat rather than a continuous uninterrupted supply of heat, as the periodic shots have advantages over the continuous supply of heat. Also, either one of the program discs could be used without the cycle disc, substituting a room thermostat or other control means in place of the cycle disc, the thermostat being placed in control during that interval when controlled heat is being introduced into the space to be heated. The electrical connections to such a thermostat would be similar to the connections shown for the cycle disc. Also, two separate thermostats, one for day control and one for night control, or a single day-night thermostat might be placed in the spaces to be heated and the program disc so wired as to bring the daytime thermostat into play when the "day-on" segment of the program disc is in the circuit and to bring the "low" thermostat into play when the "night-off" segment of the control disc is in control and to throw both thermostats out of control, producing a continuous flow of heat when the morning "heating-up" segment of the program disc is in control.

Further modifications will be apparent to those skilled in the art and it is desired, therefore, that the invention be limited only by the prior art and the scope of the appended claims.

Having thus described my invention, what I claim and desire to secure by Letters Patent is:

1. A circuit controller comprising a rotatable member rotatable about its axis and including a plurality of sector-like members having accessible conducting surfaces, and a wiper contact movable toward and from said axis for successively engaging said surfaces, the rear edge of at least one sector-like member overlapping the succeeding sector-like member, the rear edge of at least one sector-like member being a surface of insulating material to prevent simultaneous engagement of the wiper with the conducting surfaces of two adjacent sector-like members.

2. A circuit controller comprising a rotatable member rotatable about its axis and including a plurality of sector-like members having accessible conducting surfaces, and a wiper contact movable toward and from said axis for successively engaging said surfaces, the rear edge of at least one sector-like member overlapping the succeeding sector-like member, at least one of said sector-like members being angularly adjustable with respect to another about the axis of said rotatable member.

3. A circuit controller comprising a rotatable member rotatable about its axis and including a plurality of sector-like members having accessible conducting surfaces, and a wiper contact movable toward and from said axis for successively engaging said surfaces, the rear edge of each of said sector-like members overlapping a succeeding sector-like member.

4. A circuit controller comprising a rotatable member rotatable about its axis and including a plurality of sector-like members having accessible conducting surfaces for successively engaging a wiper contact, the rear edge of at least one sector-like member overlapping the succeeding sector-like member, said sector-like members being rotatably mounted in an annular support embracing the outer arcuate edges of said sector-like members.

5. A circuit controller comprising a rotatable member rotatable about its axis and including a plurality of sector-like members having accessible conducting surfaces for successively engaging a wiper contact, the rear edge of at least one sector-like member overlapping the succeeding sector-like member, said sector-like members being rotatably mounted in an annular support embracing the outer arcuate edges of said sector-like members, said support having an annular conducting surface engageable with a wiper and electrically connected with one of said sector-like members.

6. A circuit controller comprising a rotatable member having electrical conducting surfaces thereon, a contact engageable with said surfaces as the member rotates, a motor for driving said rotatable member, and variable speed transmission between said motor and rotatable member including a driving gear, a driven gear, power means for meshing and unmeshing said gears periodically, and means for varying the extent of meshed travel of said driving gear with respect to its unmeshed travel.

7. A circuit controller comprising a rotatable member having electrical conducting surfaces thereon, a contact engageable with said surfaces as the member rotates, a motor for driving said rotatable member, and variable speed transmission between said motor and rotatable member including a driving gear, a driven gear, and power means for periodically shifting the axis of one of said gears to mesh and unmesh said gears.

8. A circuit controller comprising a rotatable member having electrical conducting surfaces thereon, a contact engageable with said surfaces as the member rotates, a motor for driving said rotatable member, and variable speed transmission between said motor and rotatable member including a driving gear, a driven gear, power means comprising a rotatable cam for meshing and unmeshing said gears periodically, and means for varying the extent of meshed travel of the driving gear with respect to its unmeshed travel comprising means for varying the throw of said cam.

9. A circuit controller comprising a rotatable member having a contact surface, a contact engageable with the surface of said rotatable member, a motor for driving said rotatable member, and variable speed transmission between said motor and rotatable member, including a driving gear, a driven gear, and power means for meshing and unmeshing said gears periodically.

10. A circuit controller comprising a rotatable member having a contact surface, a contact engageable with the surface of said rotatable member, a motor for driving said rotatable member, and variable speed transmission between said motor and rotatable member, including a driving gear, a driven gear, power means for meshing and unmeshing said gears periodically, and means for varying the extent of meshed travel of said driving gear with respect to its unmeshed travel.

11. Apparatus for controlling a circuit comprising a rotatable member having a control surface, a rider engageable with said surface for controlling the circuit, a motor for driving said rotatable member, and variable speed transmission between said motor and rotatable member, including a driving gear, a driven gear, and power means for meshing and unmeshing said gears periodically.

12. Apparatus for controlling a circuit comprising a rotatable member having a control surface, a rider engageable with said surface for controlling the circuit, a motor for driving said rotatable member, and variable speed transmission between said motor and rotatable member, including a driving gear, a driven gear, power means for meshing and unmeshing said gears periodically, and means for varying the extent of meshed travel of said driving gear with respect to its unmeshed travel.

13. A circuit controller comprising a rotor having a sector-like conducting surface, the arcuate angular extent of which varies with its distance from the axis of the rotor, a contact for engaging said surface as it rotates movable to vary its distance from said axis, a continuous annular band of conducting material carried by said rotor and electrically connected with said sector-like conducting surface, and a wiper contact engaging said annular band.

14. A circuit controller comprising a rotor including a plurality of sector-like members, each having a conducting surface, said members being angularly adjustable relative to each other about the axis of the rotor, the arcuate angular extent of the exposed conducting surface varying with its distance from the axis of the rotor, and a contact for engaging said conducting surface movable to vary its distance from said axis.

15. Apparatus for controlling the flow of a control medium comprising a first time controlled rotor having control surfaces thereon, a rider disposed for successive engagement by said surfaces as said rotor rotates for controlling the flow of said medium in accordance with said successive engagement, a second time-controlled rotor having control surfaces thereon, a second rider disposed for successive engagement by the control surfaces of said second rotor for controlling the flow of said medium in accordance with said successive engagement, and means for adjusting the speed ratio of one rotor with respect to the other.

16. Apparatus for controlling the flow of a control medium comprising a first time controlled rotor having control surfaces thereon, a rider disposed for successive engagement by said surfaces as said rotor rotates for controlling the flow of said medium in accordance with said successive engagement, a second time-controlled rotor having control surfaces thereon, a second rider disposed for successive engagement by the control surfaces of said second rotor for controlling the flow of said medium in accordance with said successive engagement, and means for adjusting the position of both riders with respect to their associated rotors.

17. Apparatus for controlling the flow of a control medium comprising a first time controlled rotor having control surfaces thereon, a rider disposed for successive engagement by said surfaces as said rotor rotates for controlling the flow of said medium in accordance with said successive engagement, a second time-controlled rotor having control surfaces thereon, a second rider disposed for successive engagement by the control surfaces of said second rotor for controlling the flow of said medium in accordance with said successive engagement, means for adjusting the speed ratio of one rotor with respect to the other, and means for adjusting the position of both riders with respect to their associated rotors.

18. A circuit control apparatus comprising a rotor, a circuit opening and closing member mounted for movement with respect to said rotor, and means for moving said member, said rotor including a series of circularly-arranged portions angularly displaced with respect to each other cooperating with said circuit controlling member, the angular extent of cooperation with said member varying as said member is moved whereby the time interval between an opening and closing of the circuit varies with the movement of said member, the means for moving said member comprising an actuating member and selective-speed transmission means acting between said actuating member and circuit controlling member including readily adjustable, manually settable, selective means for selecting any one of a plurality of different speed ratios.

19. A circuit control apparatus comprising a rotor, a circuit opening and closing member mounted for movement with respect to said rotor, and means for moving said member, said rotor including a series of circularly-arranged portions angularly displaced with respect to each other cooperating with said circuit controlling member, the angular extent of cooperation with said member varying as said member is moved whereby the time interval between an opening and closing of the circuit varies with the movement of said member, the means for moving said member comprising an actuating member and selective-speed transmission means acting between said actuating member and circuit controlling member including a cam follower, a diverse contour cam, means for shifting said cam throughout a range, and readily adjustable, manually settable, selective means for selecting any one of a plurality of different cam contours for engagement with said follower throughout the range of cam movement.

20. A circuit control apparatus comprising a rotor, a circuit opening and closing member mounted for movement with respect to said rotor, and means for moving said member, said rotor including means whereby said movement varies the time interval between opening and closing the circuit, the means for moving said member comprising an actuating member and selective-speed transmission means acting between said actuating member and circuit controlling member including readily adjustable, manually settable, selective means for selecting any one of a plurality of different speed ratios.

21. A circuit control apparatus comprising a rotor, a circuit opening and closing member mounted for movement with respect to said rotor, and means for moving said member, said rotor including means whereby said movement varies the time interval between opening and closing the circuit, the means for moving said member comprising an actuating member and selective-speed transmission means acting between said actuating member and circuit controlling member including a cam follower, a diverse contour cam, means for shifting said cam throughout a range, and readily adjustable, manually settable selective means for selecting any one of a plurality of different cam contours for engagement with said follower throughout the range of cam movement.

22. Circuit control apparatus comprising chronometric means for periodically opening and closing a circuit, power controlled means for varying the length of said open and closed periods, chronometric means for periodically rendering said first means alternatively effective and ineffective to open and close the circuit, and power controlled means for varying the length of said effective and ineffective periods.

HENRY T. KUCERA.